United States Patent [19]
Bauer et al.

[11] Patent Number: 6,012,695
[45] Date of Patent: Jan. 11, 2000

[54] LONGITUDINAL GUIDE FOR A MOTOR VEHICLE SEAT WITH A PAIR OF CARRIERS COMPRISING A SEAT CARRIER AND A SLIDING CARRIER

[76] Inventors: Heinz Bauer, Hammerstr. 9, D-42699 Solingen; Burckhard Becker, Obenkatternberg 25, D-42655 Solingen; Ernst-Reiner Frohnhaus, Hammerstr. 13, D-42699 Solingen; Michael Hennicke, Freiheitstr. 10, D-42719 Solingen, all of Germany

[21] Appl. No.: 08/937,051

[22] Filed: Sep. 24, 1997

[30] Foreign Application Priority Data

Sep. 24, 1906 [DE] Germany .................... 196 39 109

[51] Int. Cl.⁷ ................................. F16M 13/00
[52] U.S. Cl. ............................................ 248/430
[58] Field of Search ........................ 248/430, 429, 248/424; 296/65.14

[56] References Cited

U.S. PATENT DOCUMENTS

| | | | |
|---|---|---|---|
| 4,533,107 | 8/1985 | Okazi et al. | 248/430 |
| 4,821,991 | 4/1989 | Aihara et al. | 248/430 |
| 5,137,244 | 8/1992 | Negi | 248/430 |
| 5,755,422 | 5/1998 | Susko et al. | 248/430 |
| 5,765,798 | 6/1998 | Isomura et al. | 248/429 X |

*Primary Examiner*—Ramon O. Ramirez
*Attorney, Agent, or Firm*—John Lezdey & Assoc.

[57] ABSTRACT

The invention relates to a longitudinal guide for a motor vehicle seat with a pair of carries comprising a seat carrier and a sliding bottom carrier, which are movable towards each other in their longitudinal direction and which are in contact with each other by means of sliding devices and/or rollers, whereby each carrier a) possesses at least two guide areas and each guide area of one carrier is adapted in a form to the related guide area of the other carrier in such a way that sliding devices and/or rollers are each taken up between two guide areas of different carries and b) possesses at least one area of gearing, which is modelled in such a way that it does not come into contact with at least one area of gearing of the corresponding other carrier under normal circumstances, but comes into contact, if the two carriers are separated from each other, and obstructs such a separation by means of gearing. For the manufacture of sectional areas of the longitudinal guide which determine the statics, two different kinds of material are used, preferably steel and light metal.

6 Claims, 1 Drawing Sheet

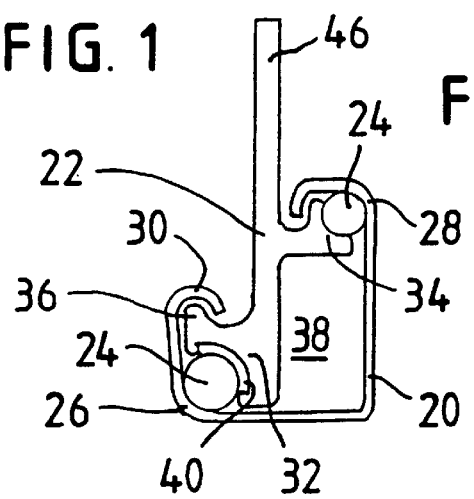
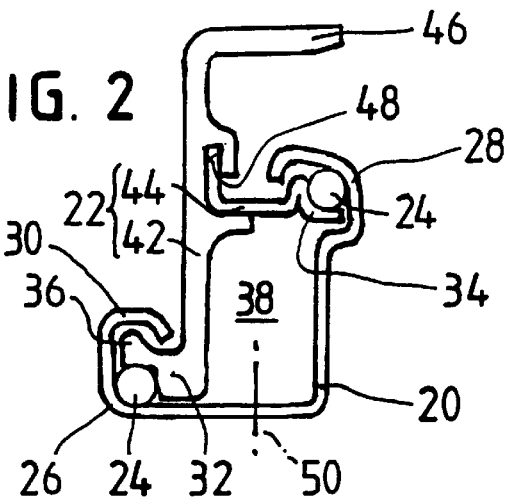
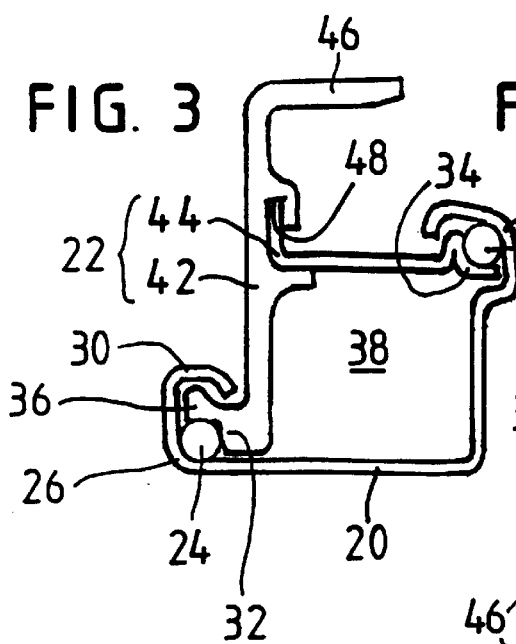
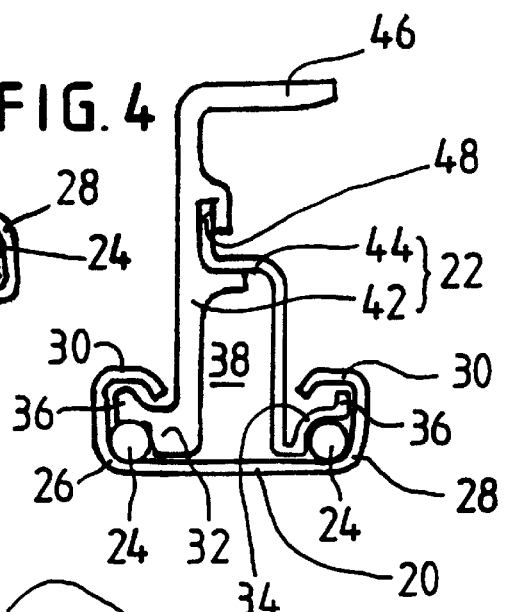
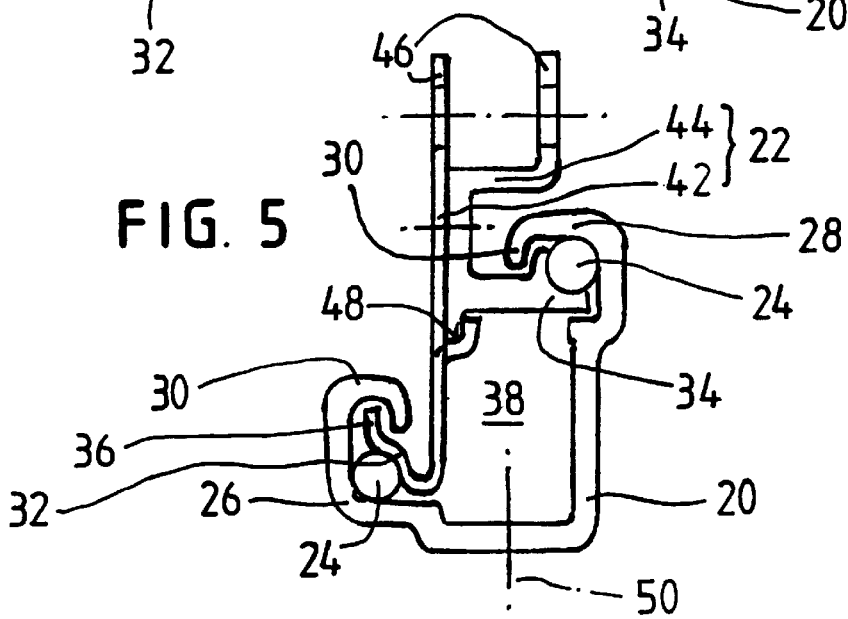

LONGITUDINAL GUIDE FOR A MOTOR VEHICLE SEAT WITH A PAIR OF CARRIERS COMPRISING A SEAT CARRIER AND A SLIDING CARRIER

BACKGROUND OF THE INVENTION

1. Field of the Invention

The invention relates to a longitudinal guide for a motor vehicle seat with a pair of carriers consisting of a seat carrier and a sliding bottom carrier, which are movable towards each other in their longitudinal direction and which are in contact with each other by means of sliding devices and/or rollers, whereby each carrier a) possesses at least two guide areas and each guide area of one carrier is adapted in a form to the related guide area of the other carrier in such a way that sliding devices and/or rollers are each taken up between two guide areas of different carriers and b) possesses at least one area of gearing, which is modelled is such away that it does not come into contact with at least one area of gearing of the corresponding other carrier under normal circumstances, but comes into contact, if the two carriers are separated from each other, and obstructs such a separation by means of gearing.

2. Description of the Art

Such longitudinal guides are known according to the state of the art. Usually a motor vehicle seat is connected with the understructure of the body of the motor vehicle seat by means of two such longitudinal guides. The carriers of a longitudinal guide are only in contact with each other in the guide areas, namely via the sliding devices and/or rollers, otherwise they are not in contact under normal circumstances. Usually two such guide areas are designed for each carrier, so that this results in two pairs altogether, which in the following will be called pairs of guide areas in effect with each other. Under normal circumstances at least the one area of gearing on each carrier is engaged free of contact into the corresponding other area of gearing of the other carrier, only when there is a sufficient separation of the carriers the gearing actually engages, the areas of gearing get in touch with each other and obstruct a further separation of the carriers of the longitudinal guide from each other.

According to the state of the art the carriers of a longitudinal guide are made of one piece on one hand and on the other hand both are manufactured from the same material. However, it is known from aluminium carriers to insert a narrow stripe made of steel or another hard material into at least one guide area, to avoid a direct contact from aluminium to aluminium or to bring about special characteristics such as a resilience for example. The sectional areas of the carriers, which are statically determining, are by all means made of aluminium or another light metal respectively.

Different demands are put on the two longitudinal guides of a motor vehicle seat. Depending on the arrangement of the safety belt one of the guides is stressed more strongly than the other. Furthermore it is known, that within a longitudinal guide, a sufficiently large, free diameter in the shape of a channel is to be provided, into which other parts can be inserted, as for example a motoric drive, a locking device or something of that sort.

SUMMARY OF THE INVENTION

It is the task of the invention to develop further the use and the embodiment of longitudinal guides prior to this invention and to provide the technical designer of seat adjustment devices with longitudinal guides, which adjust to the various demands required.

Departing from the longitudinal guide of the kind mentioned above this task is solved in such a way that for the manufacture of the sectional areas of the longitudinal guides, which determine the statics, two different materials are used, preferably steel or light metal.

The invention provides either one carrier of a longitudinal guide to be made of a first material or the second carrier to be made of a second material and/or at least one carrier of a longitudinal guide to be comprised of two or more individual sections like a modular system, which are made from various materials.

In the first case, namely a longitudinal guide manufactured with a carrier made from a first material and one made of a second material, a wider range of material for the adjustment of certain characteristics of a longitudinal adjustment device is provided, for example the compliance of a spring, resistance to a tear out and the characteristics of the gliding capacity. That way, for example, some sliding inserts, which avoid a contact from aluminium to aluminium, can be abandoned with a first carrier made of light metal and a second carrier made of steel.

With a carrier, composed of various sectional parts in the way of a modular system, a first section, made of light metal for example, can be combined with one of at least two different sections made from another material, i.e. steel. This way sections made of light metal can be used more universally and a carrier section can be composed according to the required demands.

When in practical use, the two pairs of guide areas of a longitudinal guide in effect with each other are exposed to stress in various ways, one of which might also be pressures caused by an accident. Depending on the arrangement of the pairs, for example on a diagonal or in the neighbouring comers of the section of the longitudinal guide, the one or the other pair is exposed to stress more strongly by the weight of the passenger including the weight of the seat. For example, one pair essentially takes over only the guide tasks without having to take over a major part of the weights, under these circumstances it can be constructed differently from the other pair and especially modelled for its purpose, and respectively the other pair correspondingly. According to necessity, which might be the floor space required, weights to be transferred, resistance to tear out and many more, the invention permits the suitable carrier of a longitudinal guide to be composed of material of a different kind and thereby model the pairs according to their purpose.

The invention permits the various characteristics of the materials used, for example aluminium and steel, to be used exclusively for a longitudinal guide, to optimize the resistance to a tear out for example, to provide for a desired elastic force or to adjust the initial stress within the longitudinal guide in a suitable manner.

In a preferred embodiment of a carrier, which is made from two different materials, a first sectional area is manufactured from a first material and at least one further sectional area is manufactured from another material, both sectional areas are connected with each other or can be connected with each other. For this connection the one sectional area, which is particularly a pulled or extruded sectional area, is preferably provided with a recess, an adaption or a projection, which determines the position of the other sectional area and additionally makes it easier or possible to fix the other sectional area. The recess and so forth is preferably provided at the sectional area, which can be comprised of differently modelled sectional areas made of another material.

Typically light metal, especially aluminium and steel are the materials in question for the choice of materials used. With the combination according to the invention the various characteristics of these two materials can be used for optimum benefit for the longitudinal guide, in that way the higher elastic force and firmness of steel on one hand and the lower specific weight of the aluminium along with the possibility of a very precise adaption due to the extrusion moulding method can be employed beneficially.

BRIEF DESCRIPTION OF THE DRAWINGS

Further advantages and characteristics of the invention result from the respective claims and the following illustration of a non restrictive embodiment of the invention, which will be explained with reference to the accompanying drawing. The drawing shows in:

FIG. 1: a front view of a longitudinal guide with a seat carrier constructed as a section made of aluminium and a sliding bottom carrier made from steel, both carriers are made of one piece each, FIG. 2: an illustration according to FIG. 1, with which the seat carrier however, is comprised of a section made of aluminium and a section made of steel, FIG. 3: an embodiment according to FIG. 2 by using the same section made of light metal for the seat carrier, but other sections for the other parts, FIG. 4: an illustration according to FIG. 2, but in a different embodiment, here again the same sectional area made of aluminium for the seat carrier is used and FIG. 5: an illustration according to FIG. 1 of a longitudinal guide, with which the seat carrier is manufactured of two different sectional areas, which are made of various materials, and a sliding bottom carrier made of light metal.

DESCRIPTION OF THE PREFERRED EMBODIMENTS

In the representations the represented longitudinal adjustment devices are each illustrated in an orientation, which resembles the practical assembling in a motor vehicle. A sliding bottom carrier 20 is arranged below, it comes into effect with a seat carrier 22, which is arranged above it. In the representations the sliding bottom carrier is always modelled as an encompassing carrier, the seat carrier 22 is partially placed within its section and is therefore encompassed by it. This is not necessarily the case and should be regarded here as an example, the seat carrier 22 may also be the encompassing carrier.

In the manner already known and not explicitly illustrated each time, sliding bottom carrier 20 and seat carrier 22 are provided with suitable means to attach them onto the sub-assembly of the motor vehicle or the seat respectively. For the seat carrier 22 such attachment devices are partially shown, especially flanges, onto which such an attachment might occur.

The two carriers 20, 22 are in contact with each other by means of rollers 24, these rollers can be replaced with sliding devices at least at one position of the longitudinal guide, if the representations show rollers 24 exclusively this does not represent a constriction thereto.

As can be seen from FIG. 1 the sliding bottom carrier 20 shows two guide areas, namely the guide area 26 arranged at the bottom left and the one arranged at the top right, namely the guide area 28 along a diagonal. Furthermore it shows an area of gearing 30 above the first guide area 26. The sliding bottom carrier 20 is made of a stripe-shaped blank made of a steel sheet by means of respective shaping, for example imprinting, rolling or something similar.

The seat carrier 22 is a light metal section made of aluminium by extrusion moulding method. It also shows two guide areas, namely one guide area 32 arranged at the bottom left, which makes a pair with the guide area 26 of the sliding bottom carrier 20, and the guide area 34 at the top right, which makes a pair with the guide area 28 of the sliding bottom carrier. Furthermore it shows an area of gearing 36, which is lapped over by the area of gearing 30 of the sliding bottom carrier and engages itself into the U-shape area of gearing 30 from below. A part of a carrier 20 or 22 respectively is called guide area, on to which guiding means (rollers 24) are attached.

The longitudinal guide possesses a free inner cross section, which is called channel 38 thereafter, here various additional devices can be provided as explained already in the above mentioned paragraphs. The sliding bottom carrier 20 is flexible, it leads to an initial stress, which leads to the fact that the rollers 24 are kept close to the respective guide areas.

As the rollers 24 positioned at the left bottom side essentially transfer the weights, the corresponding guide area 32 of the seat carrier 22 is laid out with a stripe shaped metal insert 40.

The seat carrier 22 projects upwards above the actual section of the longitudinal guide, the motor vehicle seat can be fixed at exactly this position, also other units may be arranged at this position. The sectional part can also be abolished at least partially, for example it can be made slanting along the length, if a sloping position between the motor vehicle seat and the adjustment device of the longitudinal guide is desired.

In the embodiment according to FIG. 2 the sliding bottom carrier 20 is modelled similar to the embodiment already mentioned, only in the right area the section is slightly changed by a bent. The difference to FIG. 1 is essentially the fact that the seat carrier 22 is now comprised of two sectional areas, which are made of different materials. The seat carrier possesses a first sectional area 42 made of light metal, it forms amongst others the guide area 32 and, just like in the embodiment illustrated according to FIG. 1, possesses a flange 46 showing upwards, on to which the seat can be attached. The second guide area 32 of the seat carrier is comprised of a second sectional area 44, which is made of a steel tube. The first sectional area 42 manufactured of aluminium possesses a receiver 48, into which a left, L-shape area of the second sectional area 44 can be pushed, engaged or put in otherwise. The second sectional area 44 models the guide area 34 at its right end side, for this purpose it is suitably shaped. The areas of gearing 30, 36 are constructed similar to the embodiment according to FIG. 1. The term sectional area describes a part of a carrier, which shows at least one guide area. The part may be connected in a way with another part (see FIG. 1) or may be modelled separately and be connected with another part (see FIG. 2–5).

Taking the embodiments according to FIGS. 3 and 4 as an example for illustration, they show how different longitudinal guides can be constructed by using the same first sectional area 42 of the carrier seat 22, in the way that the first sectional area 42 is kept and only a different sliding bottom carrier 20 and an other second sectional area 44 of the seat carrier is used. As can be seen from FIG. 3, the second sectional area 44 of the seat carrier 22, which is made from steel, again, is constructed only longer as shown in FIG. 2, its left and right final areas are kept the same with regard to their shape, however. That way it is easier to achieve a bigger channel 38 of the longitudinal guide with regard to its cross section , namely a wider channel. The sliding bottom carrier 20 is essentially kept in its shape, only the lower side on the horizontal level, which follows the guide area 26 on the right, was stretched by the same length as the second sectional area 44.

The embodiments of longitudinal guides discussed so far possessed only two rows of rollers 34 each on one hand and on the other hand these were arranged on a sectional diagonal. The embodiment according to FIG. 4 possesses only two rows of rollers 24 as well, but these are no longer arranged on a sectional diagonal. Longitudinal guides with more than two rows of sectional units 24 can be constructed as well according to the invention.

As can be seen from FIG. 4 the second sectional area 44, made of formed steel sheet, of the seat carrier 22 is U-bent towards the bottom seen from the receiver 48 and forms the guide area 34 at its loose end again. The sliding bottom carrier 20 shows a more simple section than the ones illustrated before, it is essentially C-shaped and models one area of gearing 30 each at its two loose final areas of its section. Corresponding areas of gearing 36 are designed at the guide area 32 and here also at the guide area 34 of the seat carrier. By using a second sectional area 44 made of steel a special elastic force is achieved, which is constructed according to the corresponding conditions, that way a slight tilting of the two carrier sections against each other can be achieved for example.

Finally, in the embodiment according to FIG. 5 the sliding bottom carrier 20 is manufactured of a section of light metal in one piece, it models an area of gearing 30 each in the marginal areas of its section, in the direct vicinity of theses areas of gearing the guide areas 26 or 28 respectively are positioned. The seat carrier 22 again, is comprised of two sectional areas 42, 44 made of various materials. In the embodiment shown the right hand part of the seat carrier 22, namely the second sectional area 44, is made of light metal, it models the guide area 34. This sectional area 44 shows a catch pointing downwards, which engages into a hook-like formation (receiver 48) of the first sectional area 42, furthermore the two sectional areas 42, 44 are connected with each other by means of suitable further attachments, for example screws, rivets, adherents or something of that sort. Both sectional areas 42, 44 possess a flange each, which points upwards, but is not necessary for the actual longitudinal guide. The first sectional area 42 is bent backwards to the top in its lower course and possesses an undulating section at its loose final section, that way the guide area 32 is modelled. The free end of the section projects into the interior of the left area of gearing 30 of the seat carrier 20.

By selecting other sectional areas, for example, of an altered first sectional area 42 other sectional shapes can be constructed by using an unchanged second sectional area 44 and an other sliding bottom carrier 20, as this is illustrated in the above mentioned embodiments according to FIGS. 2 and 4.

The sliding bottom carrier may also be comprised of two different sectional areas. It is preferred however, to construct the sliding bottom carrier 20 in one piece and, if at all necessary, to assemble the seat carrier 22 of two different sectional areas 42, 44.

What is claimed is:

1. A longitudinal guide for a motor vehicle seat comprising a seat carrier (22) and a bottom carrier, (20) wherein said seat carrier (22) is moveable in a longitudinal direction and wherein said bottom carrier houses a plurality of sliding means (24) and said carriers are in contact with each other by said plurality of sliding means whereby each of said carriers further comprises at least two guide areas (26, 28, 32, 34) and each of said guide areas of one carrier is relatedly adapted to each of the guide areas of the other carrier in such a way that said sliding means are positioned between the two said guide areas of the said carriers; and each said carrier further comprises at least one area of gearing which does not come into contact with at least one area of gearing of the corresponding other carrier unless the two carriers (22, 20) are separated from each other, then said areas of gearing engage and obstruct a further separation of said carriers from each other, wherein at least one carrier is comprised of a first sectional area (42) and a second sectional area (44), said first sectional area (42) and said second sectional area (44) being comprised of two different kinds of metal material, and whereby said first sectional area possesses a receiver (48) for receiving said sectional area (44) and said receiver (48) contacts said second sectional area (44) when said first sectional area (42) is connected with said second sectional area (44) for complete construction of said at least one carrier.

2. The longitudinal guide according to claim 1 wherein said guide areas are disposed diagonally from each other.

3. The longitudinal guide according to claim 1 wherein said guide areas are disposed horizontally from each other.

4. The longitudinal guide according to claim 1 wherein said seat carrier is made of aluminum and said bottom carrier is made of steel.

5. The longitudinal guide according to claim 1 wherein said seat carrier is comprised of a first section made of steel and a second section made of aluminum.

6. A longitudinal guide for a motor vehicle seat comprising a seat carrier and a bottom carrier, wherein said seat carrier is moveable in a longitudinal direction and wherein said bottom carrier houses a plurality of sliding means and said carriers are in contact with each other by said plurality of sliding means whereby each of said carriers further comprises at least two guide areas and each of said guide area of one carrier is relatedly adapted to each of the guide areas of the other carrier in such a way that said sliding means are positioned between the two said guide areas of the said carriers; and each said carrier further comprises at least one area of gearing which does not come into contact with at least one area of gearing of the corresponding other carrier unless the two carriers are separated from each other, then said areas of gearing engage and obstruct a further separation of said carriers from each other, wherein there are sectional areas of the longitudinal guide that are comprised of two different kinds of metal material, wherein the combined weight of both said carriers is supported solely by said sliding means.

* * * * *